(12) United States Patent
Kangutkar et al.

(10) Patent No.: US 12,509,074 B2
(45) Date of Patent: Dec. 30, 2025

(54) SYSTEMS AND METHODS FOR HIGH PRECISION LANE-KEEPING BY AUTONOMOUS VEHICLES

(71) Applicant: TORC Robotics, Inc., Blacksburg, VA (US)

(72) Inventors: Rasika Kangutkar, Blacksburg, VA (US); Ameya Wagh, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 189 days.

(21) Appl. No.: 18/125,351

(22) Filed: Mar. 23, 2023

(65) Prior Publication Data

US 2024/0317222 A1  Sep. 26, 2024

(51) Int. Cl.
*B60W 30/12* (2020.01)
*G06V 10/82* (2022.01)
*G06V 20/56* (2022.01)

(52) U.S. Cl.
CPC .............. *B60W 30/12* (2013.01); *G06V 10/82* (2022.01); *G06V 20/56* (2022.01); *G06V 20/588* (2022.01);

(Continued)

(58) Field of Classification Search
CPC ...... G06V 20/588; G06V 20/56; B60W 30/12
See application file for complete search history.

(56) References Cited

U.S. PATENT DOCUMENTS

| | | | | |
|---|---|---|---|---|
| 5,245,422 A | * | 9/1993 | Borcherts | G05D 1/0246 701/28 |
| 5,351,044 A | * | 9/1994 | Mathur | G05D 1/0246 340/687 |

(Continued)

FOREIGN PATENT DOCUMENTS

| | | |
|---|---|---|
| CN | 103206957 B | 3/2016 |
| CN | 108995648 A | 12/2018 |

(Continued)

OTHER PUBLICATIONS

"How to Use the Road Departure Mitigation System (ROM)" (Honda) Jun. 28, 2022 [online] [retrieved on Jun. 4, 2024]. Retrieved from the Internet <URL:https://www.youtube.com/watch?v=WBuxMbv71HY> entire document, especially 0:43-0:45.

(Continued)

*Primary Examiner* — Phutthiwat Wongwian
*Assistant Examiner* — Brian R Kirby
(74) *Attorney, Agent, or Firm* — Armstrong Teasdale LLP

(57) ABSTRACT

A vehicle can include a first camera on a first side of the vehicle and a second camera on a second side of the vehicle opposite the first side of the vehicle. The vehicle can include a processor communicatively coupled with the first camera and the second camera. The processor can be configured to receive a first image of a first lane line on a road in which the vehicle is driving from the first camera and a second image of a second lane line on the road from the second camera; detect the first lane line from the first image and the second lane line from the second image; determine a first location of the first lane line relative to a defined location of the vehicle and a second location of the second lane line relative to the defined location of the vehicle; and execute a correction sequence.

12 Claims, 7 Drawing Sheets

(52) U.S. Cl.
  CPC ... *B60W 2420/403* (2013.01); *B60W 2552/53* (2020.02)

(56) References Cited

U.S. PATENT DOCUMENTS

| | | | | |
|---|---|---|---|---|
| 5,410,346 | A * | 4/1995 | Saneyoshi | H04N 13/239 |
| | | | | 348/148 |
| 5,424,952 | A * | 6/1995 | Asayama | G01S 11/12 |
| | | | | 348/113 |
| 8,462,988 | B2 * | 6/2013 | Boon | G06V 20/588 |
| | | | | 382/104 |
| 9,031,774 | B2 * | 5/2015 | Suk | G08G 1/167 |
| | | | | 701/300 |
| 9,081,385 | B1 | 7/2015 | Ferguson et al. | |
| 9,440,535 | B2 | 9/2016 | Schofield | |
| 10,150,473 | B2 | 12/2018 | Aharony et al. | |
| 10,795,374 | B2 | 10/2020 | Kita et al. | |
| 10,970,564 | B2 | 4/2021 | Li et al. | |
| 11,042,157 | B2 | 6/2021 | Choe et al. | |
| 11,054,827 | B2 * | 7/2021 | Gdalyahu | B60W 30/14 |
| 11,068,724 | B2 | 7/2021 | Liu | |
| 11,100,344 | B2 | 8/2021 | Levi et al. | |
| 11,738,748 | B2 | 8/2023 | Craigen et al. | |
| 11,772,680 | B2 * | 10/2023 | Shapira | B60W 30/18109 |
| | | | | 701/28 |
| 11,867,527 | B2 | 1/2024 | Wada | |
| 2002/0196340 | A1 * | 12/2002 | Kato | G06T 3/4038 |
| | | | | 348/E7.086 |
| 2006/0142921 | A1 * | 6/2006 | Takeda | B60W 30/12 |
| | | | | 701/70 |
| 2008/0040004 | A1 * | 2/2008 | Breed | G01S 7/023 |
| | | | | 701/45 |
| 2010/0054538 | A1 * | 3/2010 | Boon | G06T 7/246 |
| | | | | 382/104 |
| 2011/0063097 | A1 * | 3/2011 | Naka | G06V 20/647 |
| | | | | 348/148 |
| 2011/0144859 | A1 * | 6/2011 | Suk | G06V 20/588 |
| | | | | 382/104 |
| 2012/0057757 | A1 * | 3/2012 | Oyama | G06V 20/588 |
| | | | | 382/104 |
| 2012/0062745 | A1 * | 3/2012 | Han | B60W 30/12 |
| | | | | 348/148 |
| 2012/0245817 | A1 * | 9/2012 | Cooprider | B60W 30/143 |
| | | | | 701/1 |
| 2019/0073541 | A1 | 3/2019 | Koravadi | |
| 2020/0377088 | A1 | 12/2020 | Fukushige et al. | |
| 2021/0064057 | A1 * | 3/2021 | Eldar | G08G 1/167 |
| 2021/0209380 | A1 | 7/2021 | Kwon | |
| 2021/0295061 | A1 * | 9/2021 | Yang | G06V 20/588 |
| 2022/0309805 | A1 | 9/2022 | Tanabe | |
| 2023/0029533 | A1 | 2/2023 | Kim et al. | |
| 2023/0260402 | A1 | 8/2023 | Kwon | |

FOREIGN PATENT DOCUMENTS

| | | |
|---|---|---|
| CN | 109572715 A | 4/2019 |
| CN | 110163077 A | 8/2019 |
| CN | 107364443 B | 9/2019 |
| CN | 111476057 A | 7/2020 |
| CN | 111717189 A | 9/2020 |
| CN | 112446230 A | 3/2021 |
| CN | 113762035 A | 12/2021 |
| CN | 114092914 A | 2/2022 |
| CN | 110163047 B | 4/2023 |
| DE | 102008032321 A1 | 2/2009 |
| IN | 202044000634 A | 8/2020 |
| IN | 202341086927 A | 1/2024 |
| KR | 100220193 B1 | 9/1999 |
| KR | 102119678 B1 | 6/2020 |
| KR | 20210100776 A | 8/2021 |
| KR | 20210130324 A | 11/2021 |
| KR | 102456626 B1 | 10/2022 |
| KR | 20230033226 A | 3/2023 |
| KR | 20230070080 A | 5/2023 |
| KR | 20230123822 A | 8/2023 |
| TW | 202019744 A | 6/2020 |
| WO | WO-2020098708 A1 * | 5/2020 ............ G06F 18/00 |
| WO | 2020164010 A1 | 8/2020 |

OTHER PUBLICATIONS

Trapiello. Lane detection via Hough Transform, Feb. 15, 2020, [online], [retrieved on Jun. 4, 2024]. Retrieved from the Internet <URL:https://bitesofcode.wordpress.com/2020/02/15/lane-detection-via-hough-transform/>, pp. 1 to 27, especially 10-16.

\* cited by examiner

SYSTEMS AND METHODS FOR HIGH PRECISION LANE-KEEPING BY AUTONOMOUS VEHICLES

TECHNICAL FIELD

The present disclosure relates generally to autonomous vehicles and, more specifically, to systems and methods for automatically maintaining an autonomous vehicle's position within lane lines on a road.

BACKGROUND

The use of autonomous vehicles has become increasingly prevalent in recent years, with the potential for numerous benefits, such as improved safety, reduced traffic congestion, and increased mobility for people with disabilities. However, with the deployment of autonomous vehicles on public roads, there is a growing concern about interactions between autonomous vehicles and negligent actors (whether human drivers or other autonomous systems) operating on the road.

One issue that autonomous vehicles face is being able to stay within lane lines. To stay within lane lines on a road, cameras or other sensors of an autonomous vehicle may need to be able to detect or view the lane lines so a processor can identify where to position the autonomous vehicle relative to the lane lines. However, different conditions on the road may obscure visibility of the lane lines from the cameras or sensors. Accordingly, the processor may not be able to accurately detect lane lines on the road.

SUMMARY

Lane line visibility challenges may compound for autonomous vehicles in different environments. For example, an autonomous vehicle may not be able to detect lane lines using a front-facing camera when in a high traffic (e.g., heavy traffic or traffic on both sides of the autonomous vehicle) environment. In another example, autonomous vehicles may face lateral localization challenges when faced with incorrect lane placement in multi-lane highway scenarios in featureless environments. Featureless environments may be particularly challenging for autonomous vehicles that rely on LiDAR data for lane-keeping given the lack of objects off of which light can be reflected. In another example, autonomous vehicles may have trouble identifying lane lines in highly reflective environments, such as during or after rain or during sunrise or sunset.

A system implementing the systems and methods described herein may overcome the aforementioned technical challenges. For example, an autonomous vehicle may be outfitted to include separate cameras on opposite sides of the autonomous vehicle. The cameras may be coupled or affixed to the side-view mirrors on the two sides of the autonomous vehicle. The cameras may face "forward" (e.g., face toward the front of the autonomous vehicle). For instance, the cameras may have fields of view that each include a hood of the autonomous vehicle, a wheel of the autonomous vehicle, and a view of the road on which the autonomous vehicle is driving. The view of the road can often include a view of lane lines of the lane in which the autonomous vehicle is driving. The cameras can capture images of the fields of view and transmit the captured images to a processor operating (e.g., controlling) the autonomous vehicle. The processor can receive the images and process the images to identify or detect the lane lines. The processor can maneuver the autonomous vehicle (e.g., move the autonomous vehicle to the middle of the lane) or otherwise initiate or activate an action sequence (e.g., an alert to indicate the autonomous vehicle is drifting outside of the lane). Accordingly, the autonomous vehicle may use the cameras on the opposite sides of the vehicle to operate the autonomous vehicle to stay within the same lane.

To determine the position of the autonomous vehicle within the lane or relative to the lane lanes, the processor can generate a two-dimensional model of the road. The two-dimensional model can include lane lines that the processor identifies from the images captured by the autonomous vehicles, respectively. To generate the two-dimensional model, the processor can process the images using a machine learning model (e.g., a convolutional neural network). The machine learning model can output labels (e.g., identifications of features or objects) for each of the pixels of the images. One or more of the pixels can correspond to a lane line feature in the images. The data processing system can determine a line of best fit for each of the lane lines in the images based on the pixels (e.g., a sample of the pixels) in the images for which the machine learning model output a lane line label. The processor can determine the locations of the lane lines relative to a defined location (e.g., the middle or a closest side to the respective lane line) of the autonomous vehicle based on the location of the lane lines within the images and stored locations and/or orientations of the cameras relative to the defined location of the autonomous vehicle. The processor can generate or project a two-dimensional surface (e.g., a Cartesian space) at the location the wheels of the autonomous vehicle touch the ground based on a known location of the cameras relative to the bottom of the wheels. The processor can place the representations (e.g., the lines of best fit or the point clouds) of the lane lines on the two-dimensional surface. The processor can operate or control the autonomous vehicle to be in the middle of the two representations of the lane lines on the two-dimensional surface. The processor can repeatedly generate such models or update a generated model as the processor receives images from the two cameras.

Using two cameras on the sides of an autonomous vehicle for lane-keeping can overcome typical challenges of lane-keeping using a front camera or other sensors. For instance, the locations of the cameras on the sides of the autonomous vehicle and the angles of the cameras can enable the cameras to capture images of lane lines in areas of high traffic. The locations and angles of the cameras can enable the cameras to reduce light reflection off of the lane lines during sunrise or sunset and during or after rain. The processor that receives the images from the cameras can generate representations of lane lines even when the lane lines are partially obscured, which can improve control of the autonomous vehicle in otherwise crowded environments. Thus, implementing the systems and methods described herein can lead to improved lane-keeping by autonomous vehicles.

A vehicle can include a first camera on a first side of the vehicle and a second camera on a second side of the vehicle opposite the first side of the vehicle. The vehicle can include a processor communicatively coupled with the first camera and the second camera. The processor can be configured to receive a first image of a first lane line on a road in which the vehicle is driving from the first camera and a second image of a second lane line on the road from the second camera; detect the first lane line from the first image and the second lane line from the second image; determine a first location of the first lane line relative to a defined location of the vehicle and a second location of the second lane line relative to the defined location of the vehicle; and execute a correction sequence.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting and it may be readily understood that certain aspects of the disclosed systems and methods can be variously arranged and combined, all of which arrangements and combinations are contemplated by this disclosure.

Figure 1:
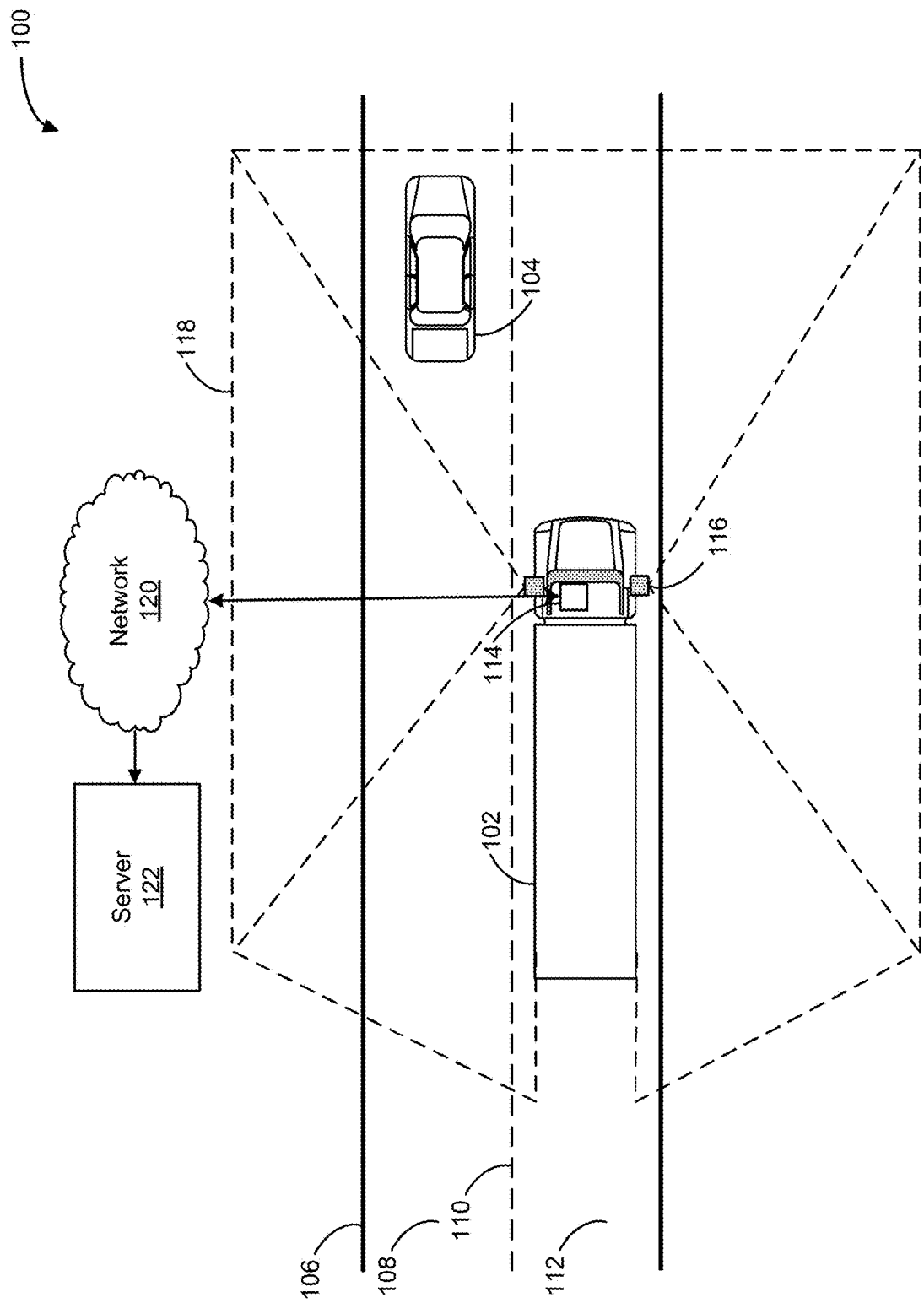
FIG. 1 depicts a bird's-eye view of a roadway including a schematic representation of a vehicle and aspects of an autonomy system of the vehicle, according to an embodiment.

Referring to FIG. 1, the present disclosure relates to autonomous vehicles, such as an autonomous vehicle 102 having an autonomy system 114. The autonomy system 114 of the vehicle 102 may be completely autonomous (fully autonomous), such as self-driving, driverless, or Level 4 autonomy, or semi-autonomous, such as Level 3 autonomy. As used herein the term "autonomous" includes both fully autonomous and semi-autonomous. The present disclosure sometimes refers to autonomous vehicles as ego vehicles. The autonomy system 114 may be structured on at least three aspects of technology: (1) perception, (2) maps/localization, and (3) behaviors planning and control. The function of the perception aspect is to sense an environment surrounding the vehicle 102 and interpret the environment. To interpret the surrounding environment, a perception module 116 or engine in the autonomy system 114 of the vehicle 102 may identify and classify objects or groups of objects in the environment. For example, a perception module 116 may be associated with various sensors (e.g., light detection and ranging (LiDAR), camera, radar, etc.) of the autonomy system 114 and may identify one or more objects (e.g., pedestrians, vehicles, debris, etc.) and features of the roadway (e.g., lane lines) around the vehicle 102, and classify the objects in the road distinctly.

The maps/localization aspect of the autonomy system 114 may be configured to determine where on a pre-established digital map the vehicle 102 is currently located. One way to do this is to sense the environment surrounding the vehicle 102 (e.g., via the perception module 116), such as by detecting vehicles (e.g., a vehicle 104) or other objects (e.g., traffic lights, speed limit signs, pedestrians, signs, road markers, etc.) from data collected via the sensors of the autonomy system 114, and to correlate features of the sensed environment with details (e.g., digital representations of the features of the sensed environment) on the digital map.

Once the systems on the vehicle 102 have determined the location of the vehicle 102 with respect to the digital map features (e.g., location on the roadway, upcoming intersections, road signs, etc.), the vehicle 102 can plan and execute maneuvers and/or routes with respect to the features of the digital map. The behaviors, planning, and control aspects of the autonomy system 114 may be configured to make decisions about how the vehicle 102 should move through the environment to get to the goal or destination of the vehicle 102. The autonomy system 114 may consume information from the perception and maps/localization modules to know where the vehicle 102 is relative to the surrounding environment and what other objects and traffic actors are doing.

FIG. 1 further illustrates an environment 100 for modifying one or more actions of the vehicle 102 using the autonomy system 114. The vehicle 102 is capable of communicatively coupling to a remote server 122 via a network 120. The vehicle 102 may not necessarily connect with the network 120 or the server 122 while it is in operation (e.g., driving down the roadway). That is, the server 122 may be remote from the vehicle, and the vehicle 102 may deploy with all the necessary perception, localization, and vehicle control software and data necessary to complete the vehicle 102's mission fully autonomously or semi-autonomously.

While this disclosure refers to a vehicle 102 as the autonomous vehicle, it is understood that the vehicle 102 could be any type of vehicle including a truck (e.g., a tractor trailer), an automobile, a mobile industrial machine, etc. While the disclosure will discuss a self-driving or driverless autonomous system, it is understood that the autonomous system could alternatively be semi-autonomous having varying degrees of autonomy or autonomous functionality. While the perception module 116 is depicted as being located at the front of the vehicle 102, the perception module 116 may be a part of a perception system with various sensors placed at different locations throughout the vehicle 102.

Figure 2:
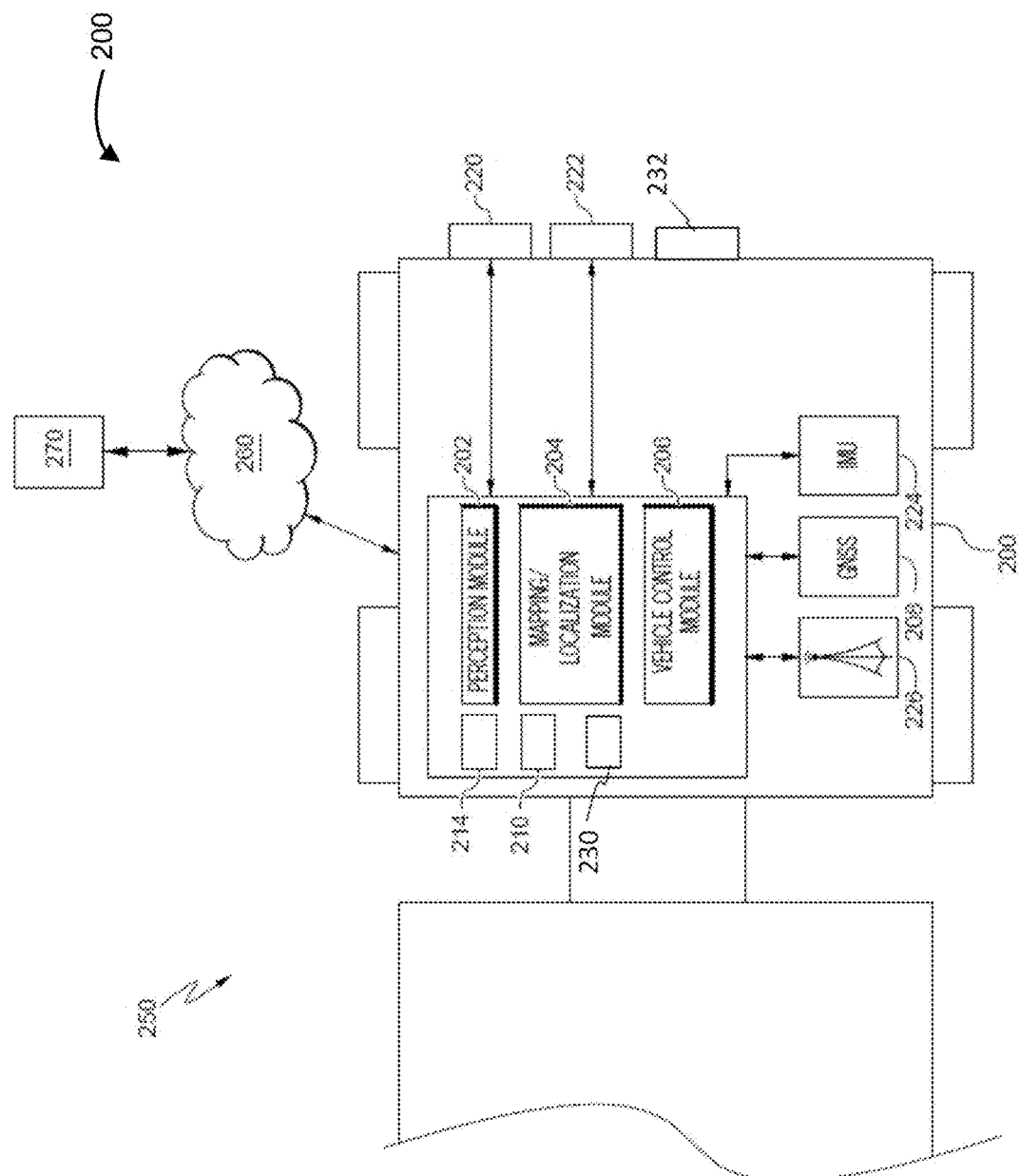
FIG. 2 depicts a system for autonomous vehicle lane-keeping, according to an embodiment.

FIG. 2 illustrates an example schematic of an autonomy system 250 of a vehicle 200, according to some embodiments. The autonomy system 250 may be the same as or similar to the autonomy system 114. The vehicle 200 may be the same as or similar to the vehicle 102. The autonomy system 250 may include a perception system including a camera system 220, a LiDAR system 222, a radar system 232, a Global Navigation Satellite System (GNSS) receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As shown in FIG. 1, the perception systems aboard the autonomous vehicle may help the vehicle 102 perceive the vehicle 102's environment out to a perception area 118. The actions of the vehicle 102 may depend on the extent of the perception area 118. It is to be understood that the perception area 118 is an example area, and the practical area may be greater than or less than what is depicted.

The camera system 220 of the perception system may include one or more cameras mounted at any location on the vehicle 102, which may be configured to capture images of the environment surrounding the vehicle 102 in any aspect or field of view (FOV). The FOV can have any angle or aspect such that images of the areas ahead of, to the side, and behind the vehicle 102 may be captured. In some embodiments, the FOV may be limited to particular areas around the vehicle 102 (e.g., forward of the vehicle 102) or may surround 360 degrees of the vehicle 102. In some embodiments, the image data generated by the camera system(s) 220 may be sent to the perception module 202 and stored, for example, in memory 214.

The camera system 220 can include cameras (or other sensors that capture images) that are located on opposite sides of the vehicle 102. For example, the camera system 220 can include one camera that is attached to a side-view mirror on one side of the vehicle 102 and another camera that is attached or mounted to a side-view mirror on the opposite side of the vehicle 102. Each camera can have an FOV in front of the vehicle 102 such that the cameras can capture images of the environment in front of the vehicle 102 as the vehicle 102 is driving forward. The two cameras can also have an orientation at an angle facing down such that a wheel or fender of the vehicle 102 is in the FOV of each camera. The orientation of the two cameras can be adjustable by the processor 210, in some cases. The two cameras can face forward and be angled downwards such that lane lines of a lane in which the vehicle 102 is driving are visible in images that the cameras capture. The two cameras can continuously or periodically (e.g., at set time intervals) capture images as the vehicle 102 is driving on the road. The cameras can transmit the captured images to the processor 210 for further processing.

The two cameras on the opposing sides of the vehicle can each be positioned (e.g., at a specific height and/or angle) for accurate image capture. For example, the two cameras can be positioned such that the respective closest lane lines to the two cameras will have a large pixel density in less distorted regions of the lenses of the cameras. For instance, the cameras can be positioned such that the closest lane lines will appear in the middle of the lenses for radial tangent lens models, which may have higher distortions on the edges of the images. The positioning can enable the cameras to capture images of the lane lines closest to the cameras in high-traffic scenarios, where cameras in the front of the vehicle would otherwise be occluded by vehicles in the same lane as the vehicle 102. The two cameras can additionally be placed or mounted to the side-view mirrors to be high enough to avoid splashing from water on the road.

The LiDAR system 222 may include a laser generator and a detector and can send and receive LiDAR signals. A LiDAR signal can be emitted to and received from any direction such that LiDAR point clouds (or "LiDAR images") of the areas ahead of, to the side, and behind the vehicle 200 can be captured and stored as LiDAR point clouds. In some embodiments, the vehicle 200 may include multiple LiDAR systems and point cloud data from the multiple systems may be stitched together.

The radar system 232 may estimate strength or effective mass of an object, as objects made out of paper or plastic may be weakly detected. The radar system 232 may be based on 24 GHz, 77 GHz, or other frequency radio waves. The radar system 232 may include short-range radar (SRR), mid-range radar (MRR), or long-range radar (LRR). One or more sensors may emit radio waves, and a processor may process received reflected data (e.g., raw radar sensor data) from the emitted radio waves.

In some embodiments, the system inputs from the camera system 220, the LiDAR system 222, and the radar system 232 may be fused (e.g., in the perception module 202). The LiDAR system 222 may include one or more actuators to modify a position and/or orientation of the LiDAR system 222 or components thereof. The LiDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the vehicle 200 (or object(s) therein). In some embodiments, the point cloud may be rendered as one or more polygon(s) or mesh model(s) through, for example, surface reconstruction. Collectively, the radar system 232, the LiDAR system 222, and the camera system 220 may be referred to herein as "imaging systems."

The GNSS receiver 208 may be positioned on the vehicle 200 and may be configured to determine a location of the vehicle 200 via GNSS data, as described herein. The GNSS receiver 208 may be configured to receive one or more signals from a global navigation satellite system (GNSS) (e.g., a GPS) to localize the vehicle 200 via geolocation. The GNSS receiver 208 may provide an input to and otherwise communicate with the mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the vehicle 200. For example, the IMU 224 may measure a velocity, acceleration, angular rate, and/or an orientation of the vehicle 200 or one or more of the vehicle 200's individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204 to help determine a real-time location of the vehicle 200 and predict a location of the vehicle 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5G, etc.). In some embodiments, the transceiver 226 may be configured to communicate with external network(s) via a wired connection, such as, for example, during initial installation, testing, or service of the autonomy system 250 of the vehicle 200. A wired/wireless connection may be used to download and install various lines of code in the form of digital files (e.g., HD digital maps), executable programs (e.g., navigation programs), and other computer-readable code that may be used by the system 250 to navigate the vehicle 200 or otherwise operate the vehicle 200, either fully autonomously or semi-autonomously.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. The autonomy system 250 may include a single microprocessor or multiple microprocessors that may include means for controlling the vehicle 200 to switch lanes and monitoring and detecting other vehicles. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote to the vehicle 200. Various other known circuits may be associated with the autonomy system 250, including signal-conditioning circuitry, communication circuitry, actuation circuitry, and other appropriate circuitry.

Figure 3:
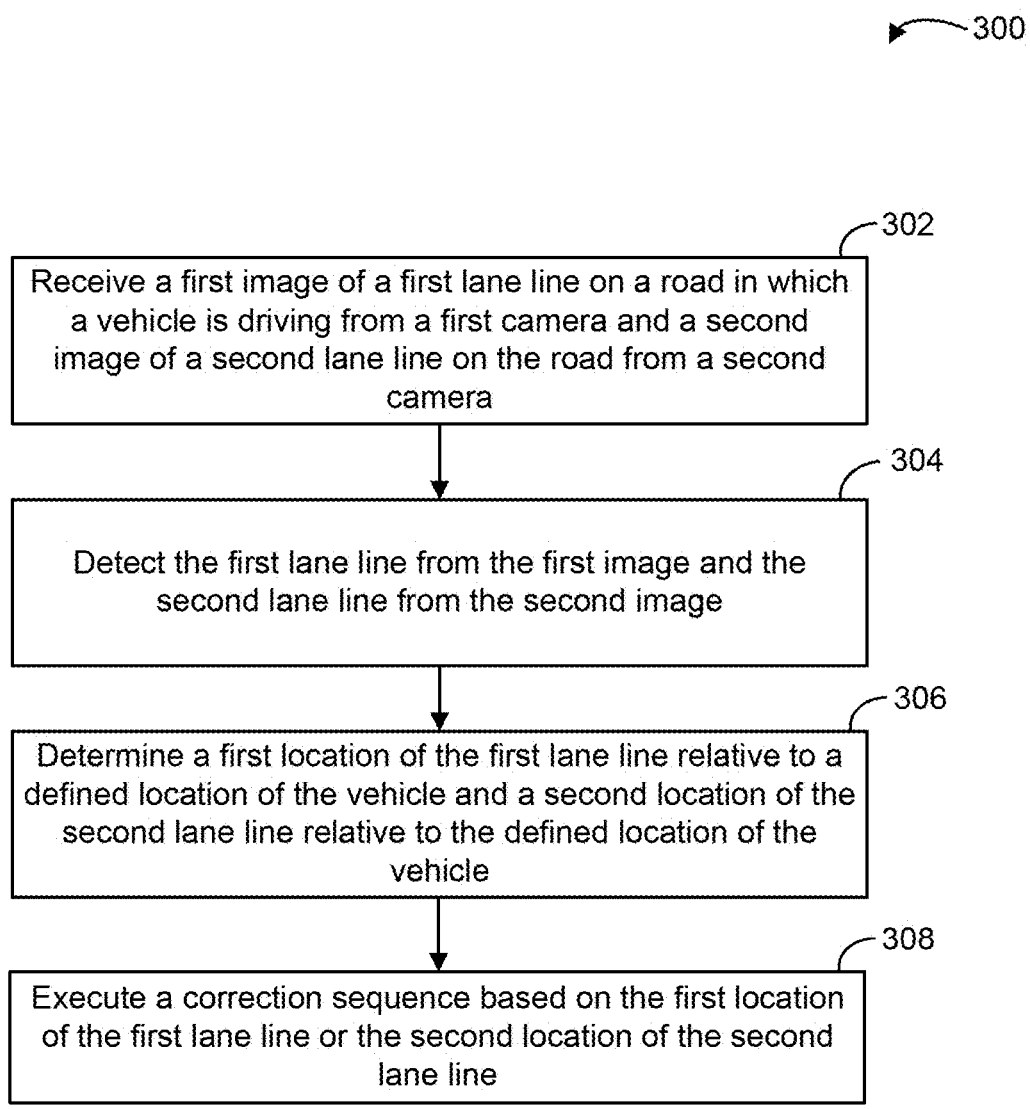
FIG. 3 depicts a method for autonomous vehicle lane-keeping, according to an embodiment.

The memory 214 of the autonomy system 250 may store data and/or software routines that may assist the autonomy system 250 in performing autonomy system 250's functions, such as the functions of the perception module 202, the mapping/localization module 204, the vehicle control module 206, lane-keeping module 230, and the method 300 described herein with respect to FIG. 3. Further, the memory 214 may also store data received from various inputs associated with the autonomy system 250, such as perception data from the perception system.

As noted above, the perception module 202 may receive input from the various sensors, such as the camera system 220, the LiDAR system 222, the GNSS receiver 208, and/or the IMU 224 (collectively "perception data") to sense an environment surrounding the vehicle 200 and interpret it. To interpret the surrounding environment, the perception module 202 (or "perception engine") may identify and classify objects or groups of objects in the environment. For example, the vehicle 102 may use the perception module 202 to identify one or more objects (e.g., pedestrians, vehicles, debris, etc.) or features of the roadway 106 (e.g., intersections, road signs, lane lines, etc.) before or beside a vehicle and classify the objects in the road. In some embodiments, the perception module 202 may include an image classification function and/or a computer vision function.

The system 250 may collect perception data. The perception data may represent the perceived environment surrounding the vehicle, for example, and may be collected using aspects of the perception system described herein. The perception data can come from, for example, one or more of the LiDAR system, the camera system, the radar system and various other externally-facing sensors and systems on board the vehicle (e.g., the GNSS receiver, etc.). For example, in vehicles having a sonar or radar system, the sonar and/or radar systems may collect perception data. As the vehicle 102 travels along the roadway 106, the system 250 may continually receive data from the various systems on the vehicle 102. In some embodiments, the system 250 may receive data periodically and/or continuously. With respect to FIG. 1, the vehicle 102 may collect perception data that indicates the presence of the lane line 110 (e.g., in order to determine the lanes 108 and 112). Additionally, the detection systems may detect the vehicle 104 and monitor the vehicle 104 to estimate various properties of the vehicle 104 (e.g., proximity, speed, behavior, flashing light, etc.). The properties of the vehicle 104 may be stored as timeseries data in which timestamps indicate the times in which the different properties were measured or determined. The features may be stored as points (e.g., vehicles, signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 250 interacts with the various features.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real-time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., the LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the vehicle 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of the vehicle 200's motion, size, etc.)

The mapping/localization module 204 receives perception data that can be compared to one or more digital maps stored in the mapping/localization module 204 to determine where the vehicle 200 is in the world and/or where the vehicle 200 is on the digital map(s). In particular, the mapping/localization module 204 may receive perception data from the perception module 202 and/or from the various sensors sensing the environment surrounding the vehicle 200 and correlate features of the sensed environment with details (e.g., digital representations of the features of the sensed environment) on the one or more digital maps. The digital map may have various levels of detail and can be, for example, a raster map, a vector map, etc. The digital maps may be stored locally on the vehicle 200 and/or stored and accessed remotely.

The vehicle control module 206 may control the behavior and maneuvers of the vehicle 200. For example, once the systems on the vehicle 200 have determined the vehicle 200's location with respect to map features (e.g., intersections, road signs, lane lines, etc.) the vehicle 200 may use the vehicle control module 206 and the vehicle 200's associated systems to plan and execute maneuvers and/or routes with respect to the features of the environment. The vehicle control module 206 may make decisions about how the vehicle 200 will move through the environment to get to the vehicle 200's goal or destination as it completes the vehicle 200's mission. The vehicle control module 206 may consume information from the perception module 202 and the mapping/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the vehicle 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the vehicle 200. The steering system may be any combination of mechanisms configured to adjust the heading or direction of the vehicle 200. The brake system may be, for example, any combination of mechanisms configured to decelerate the vehicle 200 (e.g., friction braking system, regenerative braking system, etc.). The vehicle control module 206 may be configured to avoid obstacles in the environment surrounding the vehicle 200 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller for vehicle lateral motion control and a propulsion and braking controller for vehicle longitudinal motion.

The lane-keeping module 230 may control or move the vehicle 102 to stay within a lane on a road and/or to maneuver between lanes on the road. The lane-keeping module 230 can be the same as or a part of the vehicle control module 206. The lane-keeping module 230 can receive images captured by cameras of the camera system 220 (e.g., the cameras mounted or attached to the side-view mirrors of the vehicle 102). The lane-keeping module 230 can execute one or more models (e.g., machine learning models, such as a neural network (e.g., a convolutional neural network)) to extract or identify features (e.g., labels for individual pixels and/or objects) from the images. From the extracted features, the lane-keeping module 230 can identify features that correspond to lane lines on the road on which the vehicle 102 is driving. For example, the lane-keeping module 230 can identify pixels that the one or more models labeled as corresponding to a lane line. The lane-keeping module 230 can determine the locations of the lane lines relative to the vehicle 102 from the images, such as by identifying the pixels that the lane-keeping module 230 identified as depicting lane lines. Each pixel can correspond to a location relative to the vehicle 102. Accordingly, the lane-keeping module 230 can determine the locations of the lane lines relative to the vehicle 102 based on the identified pixels. The lane-keeping module 230 can execute a correction sequence based on the locations of the lane lines relative to the vehicle 102.

The lane-keeping module 230 can execute a correction sequence by moving the vehicle 102 to a defined location (e.g., in the middle of the two lane lines) on the road or by activating an audible alert. For example, when operating in an autonomous mode and driving in a lane on a road, the lane-keeping module 230 may receive an image from each of the two cameras of the camera system 220 on opposing sides of the vehicle 102. The lane-keeping module 230 can determine the locations of the lane lines defining the lane. Based on the positions, the lane-keeping module 230 can determine that the vehicle 102 is too close to one of the lane lines and perform a correction control maneuver to move the vehicle 102 towards or to the middle of the lane. In another example, a driver may be manually driving the vehicle 102. The lane-keeping module 230 may receive an image from each of the two cameras of the camera system 220 on the opposite sides of the vehicle 102. The lane-keeping module 230 can determine the locations of the lane lines defining the lane. Based on the positions, the lane-keeping module 230 can determine that the vehicle 102 is too close (e.g., a distance below a threshold) to one of the lane lines. Responsive to the determination, the lane-keeping module 230 can generate an alert (e.g., an audible alert from a speaker of the vehicle 102 and/or a visual alert that is displayed on a display screen of the vehicle 102) to alert the driver that the vehicle 102 is driving out of a lane and/or off of the road. In some cases, the lane-keeping module 230 can move the vehicle 102 towards the middle of the lane, such as to avoid the vehicle 102 drifting into another lane or off the road. Accordingly, the lane-keeping module 230 can enable the vehicle 102 to stay within the lane. The lane-keeping module 230 can perform any correction sequence based on the images the cameras on the sides of the vehicle 102 capture.

FIG. 3 shows execution steps of a processor-based method 300 using the system 250, according to some embodiments. The method 300 shown in FIG. 3 comprises execution steps 302-308. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously.

FIG. 3 is described as being performed by a data processing system stored on or otherwise located at a vehicle, such as the autonomy system 250 depicted in FIG. 2. However, in some embodiments, one or more of the steps may be performed by a different processor, server, or any other computing feature. For instance, one or more of the steps may be performed via a cloud-based service or another processor in communication with the processor of an autonomous vehicle and/or the autonomy system of such an autonomous vehicle. In some cases, multiple (e.g., two) independent instances of the data processing system or software operating on the data processing system can concurrently perform the method 300. The different instances can run on independent embedded computing devices. Having multiple instances concurrently perform the same functionality can provide redundancy and functional safety in case of system failure by one of the instances.

Using the method 300, the data processing system may identify action sequences for lane-keeping based on images captured by cameras on the sides of a vehicle. For example, A data processing system of a vehicle (e.g., a data processing system stored on and/or controlling the vehicle) can receive images from cameras located on the sides of a vehicle driving in a lane on the road. The data processing system can execute one or more models to extract features (e.g., label pixels) from the images. From the extracted features, the data processing system can identify features that correspond to lane lines (e.g., the data processing system can identify lane lines defining the lane in which the vehicle is driving from pixels of the images labeled with a lane line label). The data processing system can generate a two-dimensional model (e.g., a two-dimensional plane) at the location at which the tires of the vehicle touch the road. The data processing system can insert representations (e.g., point clouds or lines of best fit) of the detected lane lines onto the two-dimensional model based on the features that the data processing system extracted from the images. The data processing system may then activate a correction sequence to move the vehicle to a defined location within the lane lines or generate an alert indicating the vehicle is drifting or moving outside of the lane lines based on the distance between the vehicle and lane lines on the two-dimensional model.

For example, at step 302, the data processing system receives a first image of a first lane line and a second image of a second lane line. The first image and the second image can respectively depict the first lane line and the second line on a road on which a vehicle (e.g., a vehicle on which the data processing system is located or is controlling) is traveling. The first lane line and the second lane line can define a lane in which the vehicle is driving. The first image and the second image can also depict the environment surrounding the vehicle and include portions of the vehicle, such as wheels of the vehicle and/or a hood or fender of the vehicle.

The data processing system can receive the first image and the second image from cameras located on opposite sides of the vehicle. For example, the data processing system can receive the first image from a first camera located on a first side (e.g., the left side) of the vehicle and the second image from a second camera located on a second side (e.g., the right side) of the vehicle. The first camera can be coupled, attached, or mounted to a first side-view mirror on the first side of the vehicle. The second camera can be coupled, attached, or mounted to a second side-view mirror on the second side of the vehicle. The first camera and the second camera can each be mounted to the bottom of a housing of the respective first and second side-view mirrors.

The first camera and the second camera can each capture images at a defined orientation (e.g., a defined angle) relative to the ground or a plane parallel to the orientation of the vehicle or the ground. Each of the first camera and the second camera can have a field of view in front of the vehicle (e.g., in the direction the vehicle travels in a drive mode instead of a reverse mode). The fields of view of the cameras may include the ground next to the vehicle, the tires on the respective sides of the vehicle, and the area in front of the vehicle. Because of the locations of the first and second cameras on the vehicle, the first and second images that the two cameras capture can include the lane lines directly next to the vehicle as well as lane lines in front of the vehicle.

At step 304, the data processing system detects the first lane line from the first image and the second lane line from the second image. The data processing system can detect the first and second lane lines using image processing techniques such as object detection techniques. For example, the data processing system can input the first image into a machine learning model (e.g., a neural network, such as a convolutional neural network). The data processing system can execute the machine learning model. The machine learning model can output features or labels for individual pixels of the first image and/or objects the machine learning model identified from the first image. The different labels or features may include identifications of different types of objects, such as roadway markers (e.g., lane lines) or other objects, such as signs on the road. The machine learning model can output labels for the pixels of the first lane line that is depicted in the first image or a label that identifies the first lane line as an object identified from the first image. The data processing system can similarly execute the machine learning model to obtain labels or features identifying the second lane line depicted in the second image. The data processing system can detect the first lane line and the second lane line from the respective first and second images by identifying the output labels or features from the machine learning model. The data processing system can use any technique to identify the first and second lane lines from images.

The machine learning model can have a classification capability. For example, the machine learning model output the types of the lane lines for which the machine learning model outputs labels or classifications. Examples of such types can include a single continuous lane line, a dashed lane line, and a double continuous lane line. The machine learning model can output the identifications of the types of the lane lines in the labels for the individual pixels of the images of the lane lines. The data processing system can use the types of the lane lines to determine how to control the vehicle.

At step 306, the data processing system determines a first location of the first lane line relative to a defined location of the vehicle and a second location of the second lane line relative to the defined location of the vehicle. The defined location of the vehicle can be the center or middle of the vehicle (e.g., the middle of the vehicle relative to the two sides to which the side-view mirrors are coupled or attached). The data processing system can determine the first location of the first lane line based on the location of the first lane line in the first image (e.g., the pixels for which the machine learning model output labels identifying the first lane line). For instance, each pixel may correspond to a particular distance between the defined location of the vehicle and a position of a lane line or other object on the road. The data processing system can identify the pixels that are labeled as corresponding to the first lane line and identify the location of the lane line relative to the defined location based on the stored corresponding distance for the pixel. The data processing system can similarly determine a distance for each pixel the machine learning model labeled as corresponding to the first lane line, thus the data processing system can create a point cloud of locations relative to the defined location of the vehicle (e.g., distances from the defined location of the vehicle) in which the first lane line is depicted in the first image. The data processing system can similarly determine the location of the second lane line relative to the defined location of the vehicle from the second image.

The data processing system can generate a model from the first and second images. The model can be a Cartesian space that estimates a lane line model. The lane line model can be used to estimate a probability distribution of the lateral offset to the lane center to enhance vehicle localization algorithms.

For example, the data processing system can generate a two-dimensional or three-dimensional model of a flat surface (e.g., a two-dimensional plane within a three-dimensional environment or a two-dimensional graph). The flat surface can be projected within a simulated environment at a location that corresponds to the location at which the wheels of the vehicle contact the road. The data processing system can insert the first and second lane lines that the data processing system detected from the first and second images onto the flat surface. The data processing system can also insert an object (e.g., point or value) representing the vehicle or the defined location of the vehicle onto the surface.

The data processing system can insert the first and second lane lines and the object for the vehicle onto the surface by inserting representations (e.g., point clouds or lines of best fit) of the first and second lane lines and the vehicle onto the surface. For instance, the data processing system can insert a point cloud for the first lane line and a point cloud for the second lane line onto or into the surface. The data processing system can also insert a point onto or into the surface representing the defined location of the vehicle (e.g., the middle of the vehicle). In some cases, the data processing system can insert points representing the different sides of the vehicle on the surface. Each point of the point clouds can include coordinates on the plane and/or a distance from the point to the defined location or locations of the vehicle (e.g., the middle of the vehicle and/or points representing the closest sides of the vehicle relative to the points). In some cases, the data processing system can determine the distances for each point cloud by executing a distance function or distance algorithm to determine the distance between the coordinates of the points and/or the defined location or defined locations of the vehicle. Accordingly, the data processing system can determine the distance between the lane lines on the road with the defined location and/or defined locations of the vehicle.

The data processing system can determine a closest lane line to the vehicle. For example, the closest lane line can be a lane spline or a polynomial with a y-intercept assuming an origin at the defined location of the vehicle. Based on the model, the closest lane line may be a lane line on the left side of the vehicle when the following condition is satisfied: Y-intercept−lane_width/2>0. The closest lane line may be a lane line on the right side of the vehicle when the following condition is satisfied: Y-intercept+lane_width/2<0. The data processing system can determine the width of the lane by calculating a distance between the representations of the two lane lines. The Y-intercept may be a distance between the lane lines and the defined location of the vehicle (e.g., the middle of the vehicle). The Y-intercept may be positive for the left lane line and negative for the right lane line or vice versa. As the lane lines are used to detect lateral offset (e.g., the Y-intercept), detections are close to vehicle origin, and thus simpler lane geometry models may perform well even with changes in road grade.

In some cases, the representations of the lane lines are lines of best fit that the data processing system determines from the point clouds. Such may be advantageous, for example, when the first and/or second lane lines are obscured or are not visible in the respective first and/or second images. In such cases, for example, the data processing system can generate or predict points for the obscured areas of the lane lines. For example, the processor may identify the points labeled with identifications of the first and second lane lines from the first and second images. The data processing system may sample (e.g., randomly or pseudo-randomly) the labeled points or features for the sets of points for the first and second lane lines. The data processing system can use a regression algorithm or other algorithm to generate a line of best fit between the labeled points for each lane line. The data processing system may insert points of the line of best fit or the line of best fit itself onto the surface instead of or in addition to the labels for the actual points onto the surface at the locations of the representations of the lane lines, which may or may not include areas in which the lane lines are visible in images. Accordingly, the processor may model the lane lines of the lane in which the vehicle is traveling in instances in which areas of the lane lines are covered. The lines of best fit may also be beneficial, for example, to more accurately control the vehicle when a lane line is a dashed lane line or is out of sight in front of the vehicle.

In one example, the data processing system can use an inverse perspective mapping (IPM) transform to project the identified features (e.g., the image space lane segmentation mask) to a surface (e.g., a two-dimensional static frame). The surface can closely resemble a road surface. For each lane line, the data processing system can sample the labels of the pixels for the lane line. The data processing system can sample a configurable (e.g., a user-configurable) number of labeled pixels of an image of a lane line. The data processing system can use a least square solver (e.g., ordinary least square or weighted least square solver) to generate a representation of the lane line as a polynomial or spline. In some cases, the data processing system can adjust the representation according to a distribution variance function that the data processing system can generate analytically based on the values (e.g., the coordinates) of the points for the lane line. The data processing system can insert the representation of the lane line on the surface. The data processing system can similarly generate and insert the representation of the other lane line of the lane in which the vehicle is traveling on the surface.

The data processing system can determine whether to use the model of the lane lines and vehicle for lane-keeping. The data processing system may do so based on how accurate the data processing system determines the predictions of labels indicating the lane lines to be. For example, the data processing system can determine a residual error to determine the health of lane fit for the two lane lines. The data processing system may do so by comparing a difference in position between the labeled pixels indicating the lane line and the fitted lane line of the representation of the lane line (e.g., the expected position of the lane line). The data processing system may compare an aggregate of the differences between the pixels and the lane line for each lane line with a threshold. Responsive to determining at least one of the representations has an aggregate difference exceeding a threshold, the data processing system may determine the model is not accurate and generate an error alert (e.g., an audible and/or visual alert). The data processing system can transmit the error alert to a computer (e.g., a local or remote computer) to indicate the system is not working properly and may be unsafe.

In another example, the data processing system can use a mean or average of a SoftMax output for the pixels labeled with a lane line label to determine a confidence in the positions of the respective lane lines. The data processing system can use the SoftMax function to calculate the probability of the individual pixels depicting a lane line. The data processing system can calculate a mean of all of the probabilities to determine a confidence score for the lane lines. The data processing system can calculate such a mean for the lane lines individually (e.g., a confidence score for each lane line) or in the aggregate (e.g., a single confidence score for both lane lines). The data processing system can compare the confidence score or scores to a threshold. Responsive to determining at least one of the confidence scores exceeds the threshold, the data processing system may determine the model is not accurate and generate an error alert. The data processing system can transmit the error alert to a computer (e.g., a local or remote computer) to indicate the system is not working properly and may be unsafe.

The data processing system may generate the two-dimensional representation of the flat surface using only the first image and the second image. For instance, the data processing system can generate and insert the point clouds for the first and second lane lines into a two-dimensional surface without extracting data from any other images. The data processing system may similarly generate and insert representations of the different lane lines from images into the two-dimensional surface for each set of images that the data processing system receives from the cameras on the opposing sides of the vehicle.

At step 308, the data processing system executes a correction sequence based on the first location of the first lane line or the second location of the second lane line. The correction sequence can be a control maneuver in which the data processing system moves (e.g., automatically moves) the vehicle or an activation of an alert system in which the data processing system generates an audible, visual, or audiovisual alert. The correction sequence can be an activation of any sequence or device that corresponds to a vehicle traveling or being too close to a lane line of the lane in which a vehicle is traveling.

The data processing system can execute the correction sequence in response to determining the vehicle is too close to the first lane line or the second lane line. For example, the data processing system can identify or determine the distances between the different points of the first lane line and the second lane line (e.g., the distances of the points of the first and second lane lines) and the defined location. The data processing system can compare the distances to a threshold (e.g., a defined threshold). Responsive to determining at least one of the distances is below the threshold, the data processing system can execute the correction sequence.

For example, the data processing system can be driving the vehicle in autonomous mode. The data processing system can determine the vehicle is getting too close (e.g., below a threshold distance) to the first lane line or the second lane line. In response to the determination, the data processing system can control or move the vehicle to a defined location on the road (e.g., a center of the lane in which the vehicle is driving on the road) or otherwise stop the vehicle from crossing the lane line to which the vehicle is too close.

To move the car to the middle of the lane, the data processing system may determine or identify the middle of the lane. The data processing system may do so based on the representations of the lane lines that the data processing system inserted onto the surface. For example, the data processing system can determine a distance between the two representations of the lane lines. The data processing system can identify the middle of the two representations. The data processing system can determine the middle of multiple points of the two representations of lane lines to identify an area or point on the surface as the middle of the two lane lines depicted in the images. The data processing system can compare the identified middle of the two lane lines with the defined location of the vehicle (e.g., the middle of the vehicle) and move the vehicle such that the defined location is at the determined middle of the two lane lines, and thus in the middle of the lane.

In another example, a driver can be manually driving the vehicle. The data processing system can determine the vehicle is getting too close (e.g., below a threshold distance) to the first lane line or the second lane line. In response to the determination, the data processing system can activate a speaker to emit an audible sound and/or flash a display on a screen of the vehicle. The signals may indicate to the driver that the vehicle is drifting too close to a lane line or is crossing the lane line. The driver may perform a corrective action such as by turning the steering the wheel to move the car back into the middle of the lane or otherwise away from the lane line. In some cases, the vehicle can activate the speaker and/or emit an audible sound while driving in autonomous mode in addition to automatically moving the car to the middle of the lane to indicate the correction.

In some cases, the data processing system can activate the correction sequence based on the lane line that is closest to the data processing system. For example, the data processing system can determine which of the first and second lane lines is closest to the vehicle. The data processing system can do so by identifying the point or distance that caused the data processing system to determine to activate the correction sequence (e.g., that corresponds to the distance determined to be below the threshold). The data processing system can determine whether the identified point or distance corresponds with or represents the first lane line or the second lane line. The data processing system can identify the closest lane line to the vehicle to be the lane line that corresponds with the point. The data processing system can activate the correction sequence that corresponds with the closest lane line such as, for example, by moving the vehicle away from the closest lane line, activating a light that corresponds with a lane line on the side of the vehicle closest to the closest lane line (e.g., activating a light that corresponds to the camera that captured the image of the closest lane line), emitting an audible sound associated with the side of the vehicle closest to the closest lane line, etc. In one example, the data processing system can activate a first light upon determining the vehicle is too close to a lane line on the first side of the vehicle or a second light upon determining the vehicle is too close to a lane line on the second side of the vehicle.

Figure 4:
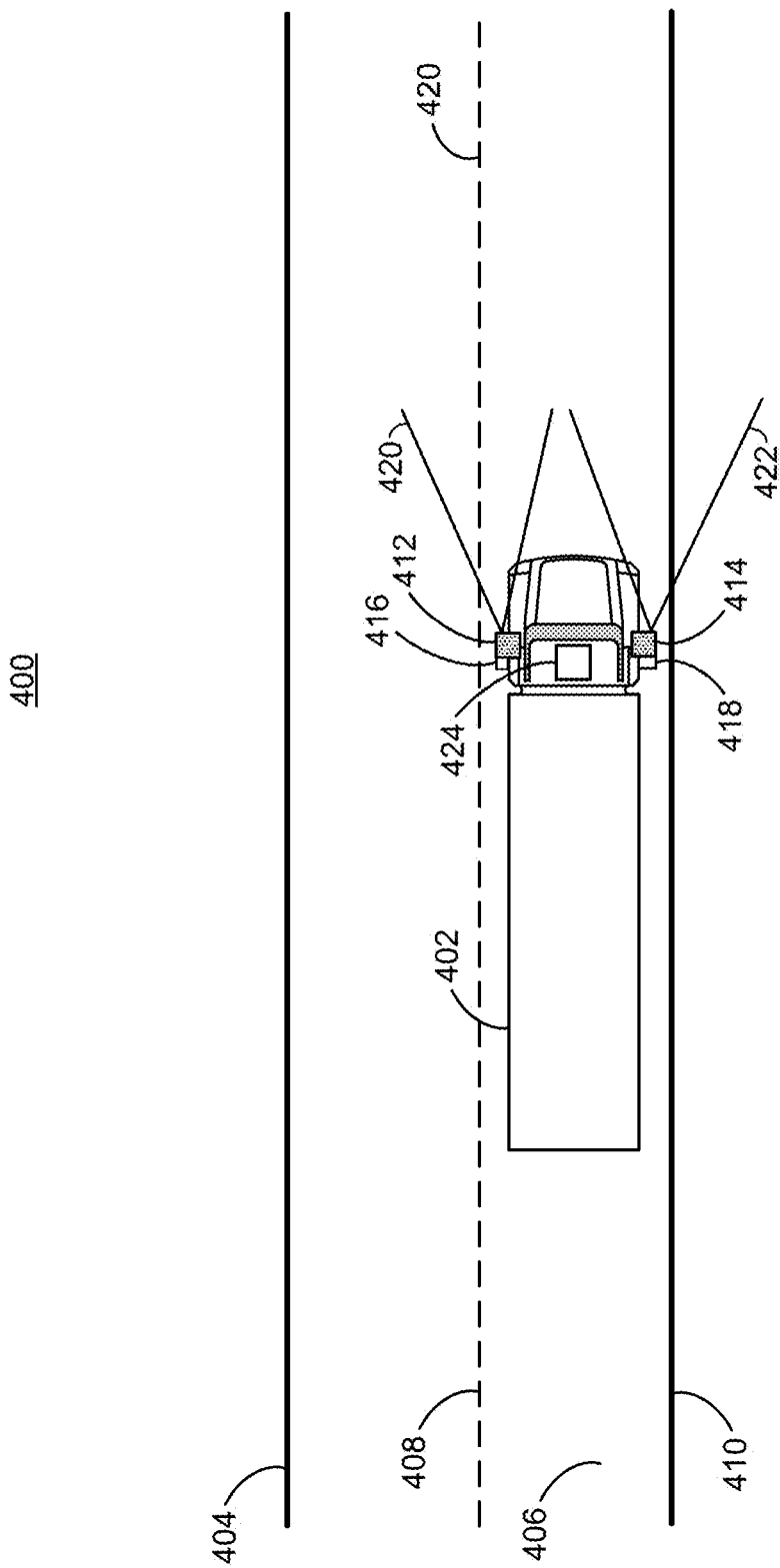
FIG. 4 depicts a bird's-eye view of a roadway scenario of autonomous vehicle lane-keeping, according to an embodiment.

FIG. 4 depicts a bird's-eye view of a roadway scenario of autonomous vehicle lane-keeping, according to an embodiment. FIG. 4 illustrates an environment 400 that includes a vehicle 402 driving on a road 404. The vehicle 402 can be the same as or similar to the vehicle 102. The vehicle 402 may be driving in a lane 406 between two lane lines 408 and 410. In some cases, the lane line 410 can be a side of the road or a curb.

The vehicle 402 can include cameras 412 and 414. The cameras 412 and 414 can respectively be attached or affixed to side-view mirrors 416 and 418 of the vehicle 402. The cameras 412 and 414 can be attached or affixed to the bottom of a housing of the side-view mirrors 416 and 418. The cameras 412 and 414 can point forward and have fields of view 420 and 422, respectively. The cameras 412 and 414 can capture images of the fields of view 420 and 422. The cameras 412 and 414 can transmit the images to a processor 424 of the vehicle 402.

The processor 424 can be a processor similar to or the same as the processor 210. The processor 424 can receive and process images from the cameras 412 and 414. For instance, the processor 424 can use object recognition techniques on an image the processor 424 receives from the camera 412 and an image the processor 424 receives from the camera 414. In doing so, the processor can identify features from the images that correspond to the lane lines 408 and 410. The processor 424 can generate a model (e.g., a two-dimensional surface) of the lane lines 408 and 410 from the identified features. The model can include a representation (e.g., an object or point on the two-dimensional surface that represents a defined location of the vehicle 402 relative to the lane lines 408 and 410) of the vehicle 402. The processor 424 can compare the locations of the representations of the lane lines 408 and 410 to the representation of the vehicle 402 in the model to determine distances between the lane lines 408 and 410 and the vehicle 402.

The processor 424 can activate a correction sequence based on the distances between the lane lines 408 and 410 and the vehicle 402. For example, the processor 424 can compare the distances between the lane lines 408 and 410 and the vehicle 402 to a threshold. Responsive to determining a distance exceeds the threshold, the processor 424 can activate an action sequence to either control the vehicle 402 to move away from the lane line 408 or 410 that is too close to the vehicle 402 and/or activate a device or light to indicate the lane line is too close to the vehicle 402. Accordingly, the processor 424 can control the vehicle 402 to avoid crossing lane lines and improve road safety.

Figure 5:
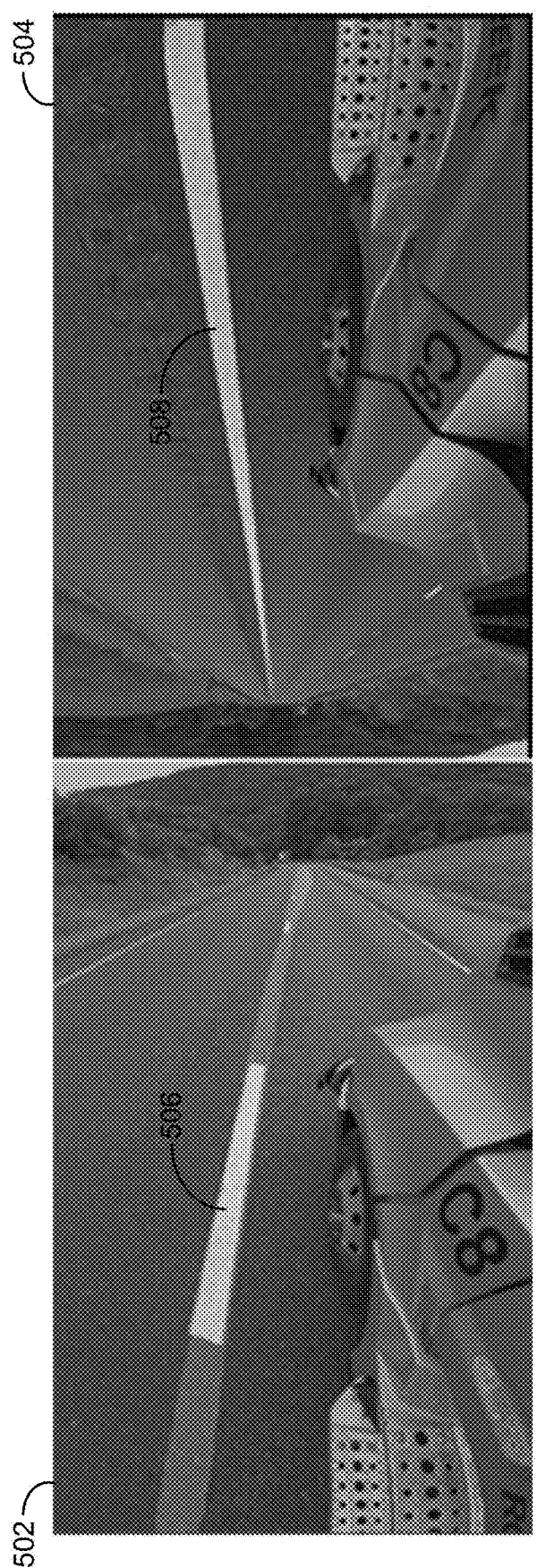
FIG. 5 depicts two images for autonomous vehicle lane-keeping, according to an embodiment.

FIG. 5 depicts two images 502 and 504 for autonomous vehicle lane-keeping, according to an embodiment. The image 502 can be captured by a camera (e.g., the camera 412) attached to a first side (e.g., left side) of a vehicle (e.g., the vehicle 402). The image 504 can be captured by a camera (e.g., the camera 414) attached to a second side (e.g., right side) of the vehicle (e.g., the same vehicle). The image 502 can depict an example representation of a lane line 506 overlaying a real-world lane line. The image 502 can depict an example representation of a lane line 508. The two lane lines together can indicate a lane in which the vehicle is traveling. A processor implementing the systems and methods described herein and controlling the vehicle can generate or determine the example representations of the lane line 506 and the lane line 508. As illustrated, the example representation of the lane line 506 can be a continuous line despite the corresponding real-world lane line being a dashed lane line. The continuous nature of the representations of the lane line can help the processor accurately control the vehicle to stay in the lane despite there being gaps in the lane lines that may otherwise affect the accuracy of the processor's control of the vehicle to stay between the lane lines.

Figure 6:
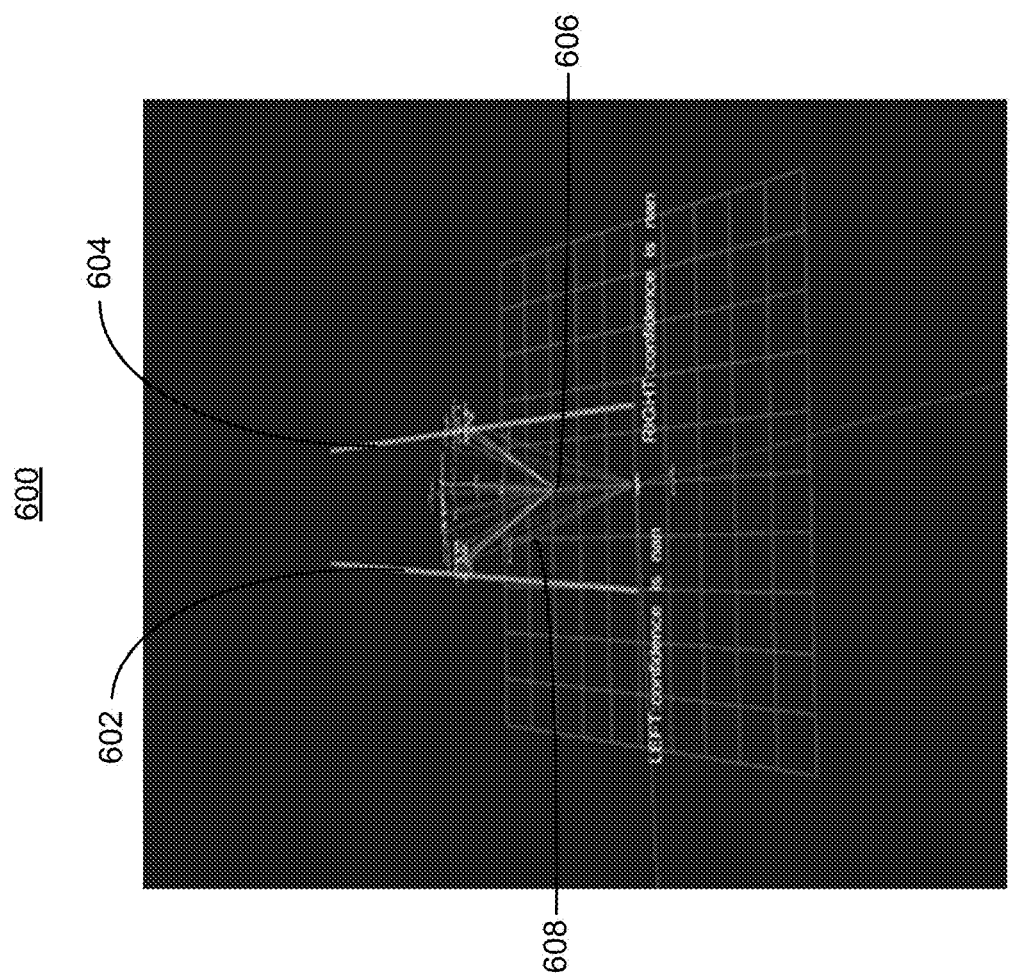
FIG. 6 depicts a two-dimensional model for autonomous vehicle lane-keeping, according to an embodiment.

FIG. 6 depicts a two-dimensional model 600 for autonomous vehicle lane-keeping, according to an embodiment. The model 600 is an example of a model the autonomy system 250 can create based on images the processor 210 receives from cameras on opposite sides of the vehicle 102. For example, based on two images that the processor 210 receives from the cameras, the processor 210 can generate a representation 602 of a first lane line and a representation 604 of a second lane line on a road in which the vehicle 102 is traveling. The vehicle may be represented by a point 606 of the model. The processor 210 can calculate distances 608 between the representations 602 and 604 of the two lane lines and the point 606. The processor 210 can use the distances 608 to determine whether to activate any correction sequences.

Figure 7:
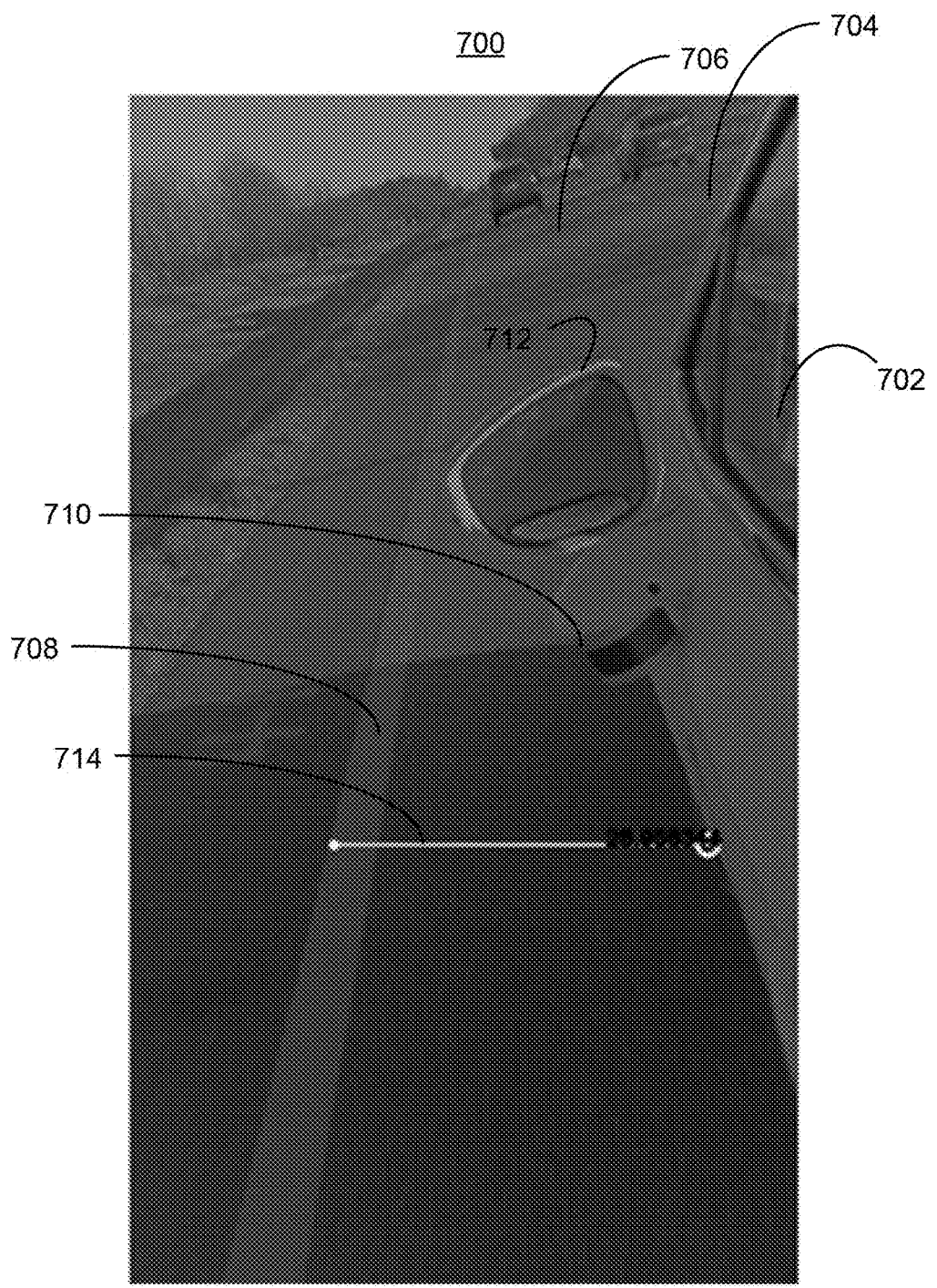
FIG. 7 is an image depicting a distance between a vehicle and a lane line, according to an embodiment.

FIG. 7 is an image 700 depicting a distance between a vehicle and a lane line, according to an embodiment. As illustrated in the image 700, a vehicle 702 (e.g., the vehicle 102) can drive on a road 704. In doing so, the vehicle 702 can drive within a lane 706 that is outlined by at least one lane line 708. While driving on the road 704, a camera 710 can be connected or affixed to a side-view mirror 712 of the vehicle 702. The camera 710 can capture an image of the road 704 and the lane line 708 and transmit the image to a processor of the vehicle 702. The processor can insert a representation of the lane line 708 on a surface that also includes a representation of the vehicle 702. The processor can compare different points of the lane line 708 with the representation of the vehicle 702 on the surface to determine distances between the vehicle 702 and the lane line 708. An example of such a distance is illustrated in the image 700 as a distance 714.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A vehicle comprising:
    a first camera on a first side of the vehicle;
    a second camera on a second side of the vehicle opposite the first side of the vehicle, the first camera and the second camera each having a field of view in a direction in which the vehicle drives forward; and
    a processor communicatively coupled with the first camera and the second camera, the processor configured to:
        receive a first image of a first lane line on a road in which the vehicle is driving from the first camera and a second image of a second lane line on the road from the second camera;
        generate a model of the road based on the first image and the second image, the model including a two-dimensional representation of a surface located on the road on which the vehicle is driving;
        generate a first representation of the first lane line by:
            sampling one or more pixels labeled as a lane line feature from the first image; and
            calculating a first line of best fit between labeled pixels from the sampled one or more pixels from the first image; and
        generate a second representation of the second lane line by:
            sampling one or more pixels labeled as a lane line feature from the second image; and
            calculating a second line of best fit between labeled pixels from the sampled one or more pixels from the second image;
        insert the first representation of the first lane line and the second representation of the second lane line onto the two-dimensional representation of the surface;
        detect the first lane line from the first image and the second lane line from the second image;
        determine a first location of the first lane line relative to a defined location of the vehicle and a second location of the second lane line relative to the defined location of the vehicle by determining the first location of the first lane line and the second location of the second lane line based on the first representation of the first lane line and the second representation of the second lane line; and
        execute a correction sequence based on the first location of the first lane line or the second location of the second lane line.

2. The vehicle of claim 1, wherein the first camera is located on a first side-view mirror coupled with the first side of the vehicle and the second camera is located on a second side-view mirror coupled with the second side of the vehicle.

3. The vehicle of claim 1, wherein the processor is configured to execute the correction sequence by moving the vehicle to a defined location of the road.

4. The vehicle of claim 1, wherein the processor is configured to execute the correction sequence by initiating an audible alert indicating the vehicle is crossing one of the first lane line or the second lane line.

5. The vehicle of claim 1, wherein the processor is configured to:
    insert the first representation of the first lane line and the second representation of the second lane line into the two-dimensional representation based on an identified portion of the first lane line from the first image and an identified portion of the second lane line from the second image.

6. The vehicle of claim 1, wherein the processor is configured to:
    insert the first representation of the first lane line and the second representation of the second lane line into the two-dimensional representation to include points in the first representation that are not visible in the first image and points in the second representation that are not visible in the second image.

7. The vehicle of claim 6, wherein the processor is configured to generate the two-dimensional representation of the surface based only on the first image and the second image.

8. The vehicle of claim 1, wherein the processor is configured to:
    calculate a middle of a lane as the location midway between the first representation of the first lane line and the second representation of the second lane line, and wherein the processor is configured to execute the correction sequence by moving the vehicle to the middle of the lane.

9. The vehicle of claim 1, wherein the processor is further configured to:
    determine which of the first lane line and the second lane line is closest to the defined location of the vehicle, wherein the processor is configured to execute the correction sequence based on the determination as to which of the first lane line and the second lane line is closest to the defined location of the vehicle.

10. The vehicle of claim 9, wherein the processor is configured to execute the correction sequence by:
activating a first light of the vehicle responsive to a determination that the first lane line is closest to the defined location of the vehicle; or
activating a second light of the vehicle responsive to a determination that the second lane line is closest to the defined location of the vehicle.

11. The vehicle of claim 1, wherein the processor is configured to:
execute a machine learning model on the first image and the second image to generate features of the first image and the second image,
wherein the processor is configured to detect the first lane line from features generated from the first image and the second lane line from features generated from the second image.

12. The vehicle of claim 11, wherein the machine learning model is a convolutional neural network.

\* \* \* \* \*